United States Patent
Yang et al.

(10) Patent No.: US 9,673,643 B2
(45) Date of Patent: Jun. 6, 2017

(54) BATTERY PRESENCE DETECTING METHOD, APPARATUS AND CHARGING SYSTEM

(71) Applicant: Huawei Technologies Co., Ltd., Shenzhen, Guangdong (CN)

(72) Inventors: Yang Yang, Chengdu (CN); Hui Li, Shenzhen (CN); Jianping Wang, Chengdu (CN); Pengfei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 201 days.

(21) Appl. No.: 14/500,787

(22) Filed: Sep. 29, 2014

(65) Prior Publication Data
US 2015/0102778 A1 Apr. 16, 2015

(30) Foreign Application Priority Data
Oct. 11, 2013 (CN) .......................... 2013 1 0474452

(51) Int. Cl.
*H02J 7/00* (2006.01)

(52) U.S. Cl.
CPC ................... *H02J 7/0036* (2013.01)

(58) Field of Classification Search
CPC .................................... H02J 7/0036
USPC ........................................ 320/134
See application file for complete search history.

(56) References Cited

U.S. PATENT DOCUMENTS

| 4,322,685 | A | 3/1982 | Frailing et al. |
| 5,757,192 | A | 5/1998 | McShane et al. |
| 6,060,864 | A * | 5/2000 | Ito ............... G01R 19/16542 320/134 |
| 6,208,148 | B1 * | 3/2001 | Yuen .................... H02J 1/10 324/433 |
| 6,888,354 | B1 * | 5/2005 | Gofman ............. H02J 7/0031 320/137 |

(Continued)

FOREIGN PATENT DOCUMENTS

| CN | 1766656 A | 5/2006 |
| CN | 101086516 A | 12/2007 |

(Continued)

*Primary Examiner* — Drew A Dunn
*Assistant Examiner* — Jerry D Robbins
(74) *Attorney, Agent, or Firm* — Leydig, Voit & Mayer, Ltd.

(57) ABSTRACT

Embodiments of the present invention provide a battery presence detecting apparatus, including: a detection triggering module, configured to detect a charging current on a battery terminal and trigger a logic control module when the charging current is less than a preset current threshold; the logic control module, configured to turn off a battery charging system and instruct a charging and discharging balancing module to perform a charging operation and then a discharging operation on the battery terminal; and a detection determining module, configured to detect a voltage on the battery terminal when the discharging operation is performed and determine whether the voltage on the battery terminal is less than a preset detection voltage, and if the voltage on the battery terminal is less than the preset detection voltage, determine that the battery is absent, and otherwise, determine that the battery is present.

10 Claims, 10 Drawing Sheets

(56) References Cited

U.S. PATENT DOCUMENTS

| | | | |
|---|---|---|---|
| 2007/0182366 A1* | 8/2007 | Lee | G01R 31/3648 320/107 |
| 2011/0260755 A1* | 10/2011 | Littow | H02J 7/0008 327/58 |
| 2013/0134940 A1* | 5/2013 | Tominaga | B60L 11/1846 320/109 |

FOREIGN PATENT DOCUMENTS

| | | |
|---|---|---|
| CN | 101399448 A | 4/2009 |
| CN | 102680909 A | 9/2012 |

* cited by examiner

BATTERY PRESENCE DETECTING METHOD, APPARATUS AND CHARGING SYSTEM

CROSS-REFERENCE TO RELATED APPLICATION

This Application claims priority to Chinese Patent Application No. 201310474452.9, filed on Oct. 11, 2013, which is hereby incorporated by reference in its entirety.

TECHNICAL FIELD

The present invention relates to the field of battery detecting technologies, and more specifically, to a battery presence detecting method, an apparatus, and a charging system.

BACKGROUND

At present, electronic devices (in particular, mobile electronic devices, such as a smart phone, a tablet, a notebook computer, or a portable instrument light) that are powered by a battery are widely used in people's everyday life. These electronic devices are generally equipped with a battery charging and discharging control system. At times, a battery is disconnected due to a fault or a battery is manually inserted or removed. Therefore, if a situation of battery presence cannot be detected in time, a normal operation of the system may be potentially affected.

SUMMARY

Embodiments of the present invention provide a battery presence detecting method, an apparatus, and a charging system, to detect whether a battery is present.

According to a first aspect, a battery presence detecting apparatus applied to a battery charging system is provided, including a detection triggering module, a logic control module, a charging and discharging balancing module, and a detection determining module, where:

the detection triggering module is connected to a battery terminal in the battery charging system, is configured to detect a charging current on the battery terminal, and send a triggering signal to the logic control module when the charging current is less than a preset current threshold;

the logic control module is configured to send a charging closing instruction to the battery charging system and send a first operation instruction to the charging and discharging balancing module after the triggering signal is received;

the charging and discharging balancing module is configured to perform a charging operation and then a discharging operation on the battery terminal according to the first operation instruction, and send a first detection instruction to the detection determining module when the discharging operation is performed on the battery terminal; and the detection determining module is configured to detect a voltage on the battery terminal when the first detection instruction is received, and determine whether the voltage on the battery terminal is less than a preset detection voltage, and if the voltage on the battery terminal is less than the preset detection voltage, determine that a battery of the battery charging system is absent, and otherwise, determine that the battery is present, where the preset detection voltage is less than a normal working voltage when the battery is present.

In a first possible implementation manner of the first aspect, the apparatus further includes:

a processing module, configured to send a second detection instruction to the detection determining module when a result of the determining by the detection determining module is that the battery is absent, where:

the detection determining module is further configured to detect the voltage on the battery terminal when the second detection instruction is received, determine whether the voltage on the battery terminal is greater than the preset detection voltage, and send a second operation instruction to the charging and discharging balancing module if the voltage on the battery terminal is greater than the preset detection voltage;

the charging and discharging balancing module is further configured to perform the charging operation and then the discharging operation on the battery terminal according to the second operation instruction, and send a third detection instruction to the detection determining module when the discharging operation is performed on the battery terminal; and the detection determining module is further configured to detect the voltage on the battery terminal when the third detection instruction is received, and determine whether the voltage on the battery terminal is greater than the preset detection voltage, and if the voltage on the battery terminal is greater than the preset detection voltage, determine that the battery of the battery charging system is present, and otherwise, determine that the battery is absent.

With reference to the first aspect and the first possible implementation manner of the first aspect, in a second possible implementation manner of the first aspect, the apparatus further includes: a timing module, configured to instruct the charging and discharging balancing module to perform the charging operation and the discharging operation on the battery terminal within a preset period of time.

With reference to the second possible implementation manner of the first aspect, in a third possible implementation manner of the first aspect, preset periods of time in which the charging and discharging balancing module performs, as instructed by the timing module, the charging operation and the discharging operation on the battery terminal are the same.

With reference to any one of the foregoing possible implementation manners of the first aspect, in a fourth possible implementation manner of the first aspect, the detection triggering module includes a charging current sensor and a comparator, where:

an output end of the charging current sensor is connected to a positive input end of the comparator, a negative input end of the comparator receives a preset reference voltage value, and an output end of the comparator is connected to the logic control module;

the charging current sensor is configured to detect the charging current on the battery terminal, and output a voltage value corresponding to the detected charging current to the positive input end of the comparator; and the comparator is configured to compare the voltage value output by the charging current sensor with the preset reference voltage value, and send the triggering signal to the logic control module when the voltage value output by the charging current sensor is less than the preset reference voltage value, where:

the preset reference voltage value corresponds to the preset current threshold.

With reference to any one of the foregoing implementation manners of the first aspect, in a fifth possible implementation manner of the first aspect, the charging and discharging balancing module includes a first current source and a second current source, where a current of the first current source is the same as a current of the second current source.

With reference to any one of the foregoing possible implementation manners of the first aspect, in a sixth possible implementation manner, the detection determining module includes a second comparator, where:

a positive input end of the second comparator is connected to the battery terminal of the charging system, and a negative input end of the second comparator is connected to the preset detection voltage, and an output end of the second comparator serves as an output end of the battery presence detecting apparatus and outputs a signal that indicates whether the battery is present; and the second comparator is configured to compare the detected voltage on the battery terminal with the preset detection voltage, and if the voltage on the battery terminal is less than the preset detection voltage, determine that the battery is absent, and output a signal that indicates that the battery is absent, and otherwise, determine that the battery is present, and output a battery presence signal, or output no signal to indicate that the battery is present.

According to a second aspect, a battery charging system is provided, where the system includes the battery presence detecting apparatus described in any one of possible implementation manners of the first aspect.

According to a third aspect, a battery presence detecting method is provided, where the method includes:

detecting a charging current on a battery terminal;

turning off a charging loop of a battery charging system when the charging current is less than a preset current threshold;

performing a charging operation and then a discharging operation on the battery terminal, and detecting a voltage on the battery terminal in a process of performing the discharging operation; and if the voltage on the battery terminal is less than a preset detection voltage, determining that a battery is absent; otherwise, determining that the battery is present, where the preset detection voltage is less than a normal working voltage when the battery is present.

In a first possible implementation manner of the third aspect, after the determining that a battery is absent, the method further includes:

detecting the voltage on the battery terminal;

when the voltage on the battery terminal is greater than the preset detection voltage, performing the charging operation and then the discharging operation on the battery terminal, and re-detecting the voltage on the battery terminal in a process of performing the discharging operation; and if the re-detected voltage on the battery terminal is greater than the preset detection voltage, determining that the battery is present; otherwise, determining that the battery is absent.

With reference to the third aspect and the first possible implementation manner of the third aspect, in a second possible implementation manner of the third aspect, the determining that the battery is present includes: outputting a battery presence signal or a first preset signal; and the determining that a battery is absent includes: outputting a battery absence signal or a second preset signal.

It may be seen from the foregoing solutions that, compared with the prior art, in the embodiments of the present invention, battery presence detection can be performed only when a battery terminal is connected, which is applicable to a rechargeable battery that only has a "+" terminal and a "−" terminal. In addition, it is unnecessary to periodically turn off a charging loop in a charging process; instead, detection is triggered in a case in which a charging current decreases to a certain extent; therefore, influence on the charging efficiency is relatively small. In addition, charging and discharging operations are preformed during detection, and then the detection is performed. In this case, no extra energy loss of a battery is caused, thereby prolonging battery life.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
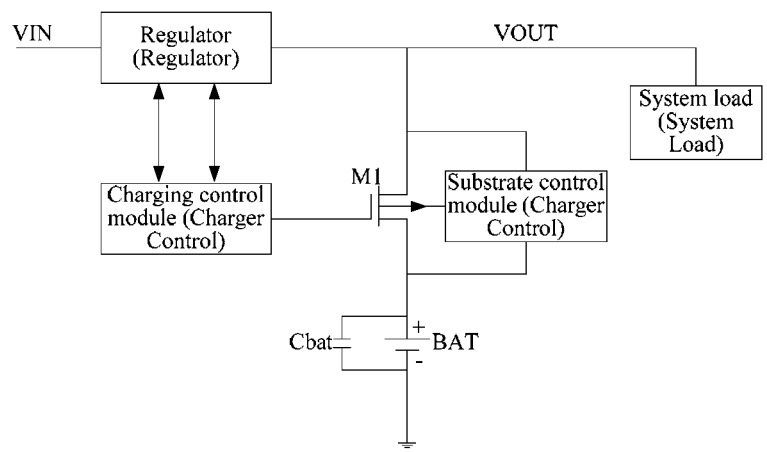
FIG. 1 exemplarily shows a diagram of a possible charging and discharging structure.

In general, a charging and discharging system is required to report a case of battery absence, so as to enable software and hardware of the system to respond in time. FIG. 1 shows a possible charging and discharging structure. As shown in FIG. 1, the structure charges a battery by using a charging control module and a power tube M1; and a bat_track (battery tracking) technology is adopted in a charging process. That is, an output voltage (VOUT) changes with a battery voltage (VBAT), and a certain voltage drop is maintained, that is, VOUT=VBAT+ΔV. In this structure, if the battery is removed in the charging process, in a case in which a battery presence detecting mechanism is absent, the charging control module can continuously charge a battery terminal and a system load can also continuously pulls a current. As a result, a voltage on the battery terminal is repeatedly in states of charging termination and charging recovering; repeated voltage oscillation on the battery terminal is caused; voltage oscillation of an output voltage may also occur due to following the voltage on the battery terminal, which may cause some potential risks to a post-stage device. For example, output instability may lead to performance reduction of a post-stage component, or even frequent switching-on or switching-off, thereby increasing a risk that the system is out of control. The post-stage device involved in this embodiment refers to a chip or a load component that uses an output end of a charging chip as an input stage, and this type of devices need a stable input voltage. Details are not described herein again.

Figure 2:
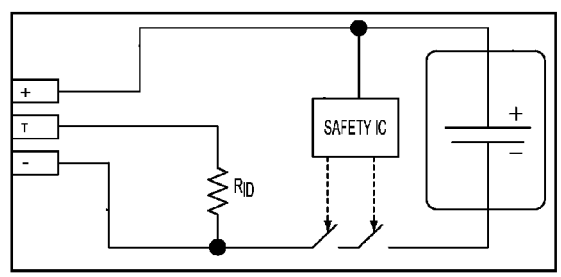
FIG. 2 exemplarily shows a structural diagram of a three-terminal battery.
Figure 3:
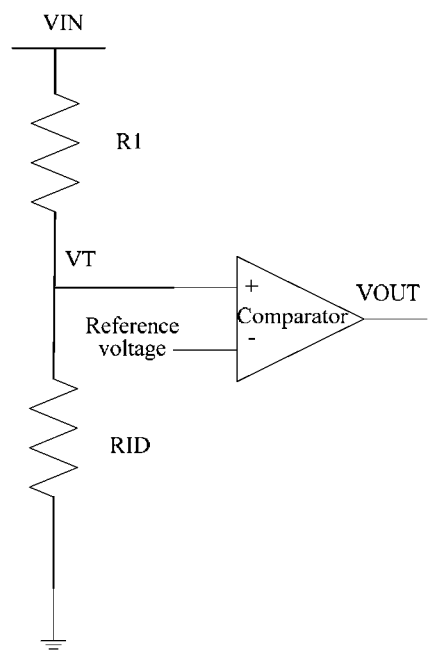
FIG. 3 exemplarily shows a structural diagram in which battery presence is detected by using a "T" terminal (temperature detecting terminal) of a battery.

Therefore, a battery presence detecting mechanism needs to be set to avoid the foregoing problem that exists in the structure shown in FIG. 1. A possible solution is to detect whether a battery is present by using a "T" terminal (temperature detecting terminal) possessed by the battery. FIG. 2 shows a three-terminal battery structure, where three terminals include: a "+" terminal (a positive terminal), a "−" terminal (a negative terminal), and the "T" terminal that is used for temperature detection; an RID is a built-in resistor of a battery; and a safety integrated circuit (SAFETY IC) can determine whether to disconnect a charging circuit according to a temperature of the "T" terminal. For this type of battery, whether the battery is removed may be determined by using a pull-up resistor and the "T" terminal, and by detecting whether a voltage on the "T" terminal exceeds a preset threshold. For example, in a structure shown in FIG. 3, a resistor R1 is the pull-up resistor; the resistor RID is a built-in resistor of the battery; the resistor R1 is connected between the "T" terminal (as shown by VT in FIG. 3) and a voltage input end VIN; a resistance value of the resistor RID is a known value (which is not greater than 200 K ohms), so a VT (that is, a voltage on the "T" terminal) is in a fixed range when a battery is present, whereas a value of the VT is pulled to a supply voltage through the resistor R1 when the battery is removed. Therefore, whether the battery is removed may be determined based on whether a signal of a VOUT is output.

However, it is found by analysis that the foregoing solution mainly depends on the "T" terminal of the battery. For a battery without a "T" terminal, for example, a common two-contact (there are only a positive terminal and a negative terminal) battery at present, battery presence detection cannot be implemented; moreover, existence of a pull-up resistor increases power consumption of the system.

Figure 4:
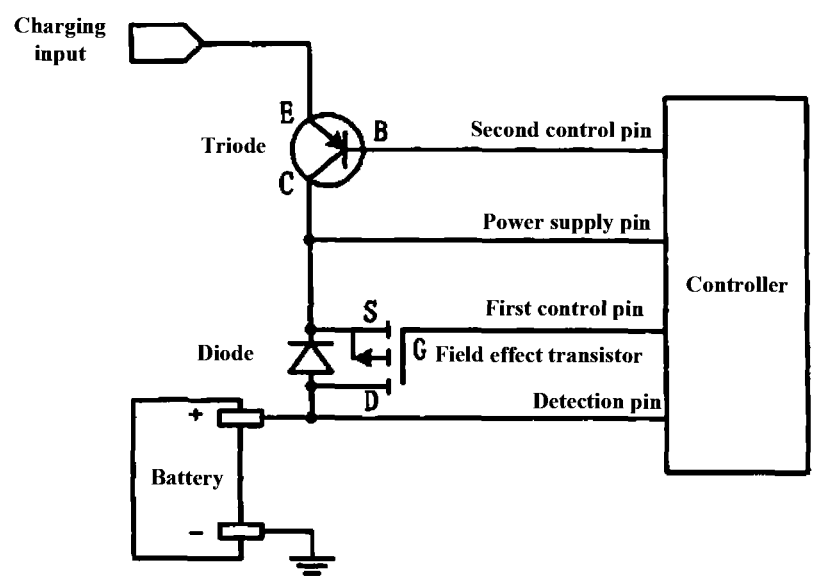
FIG. 4 exemplarily shows a structural diagram of a battery presence detecting solution for a two-contact battery.

FIG. 4 shows a structure for a battery presence detecting solution of a two-contact battery, where a triode and a diode are disposed on a charging loop. During charging of a battery, a controller periodically disconnects the charging loop (that is, disconnecting the triode and the diode) and detects whether the battery is present by using a detecting pin that is connected to a "+" terminal of the battery.

However, it is found by research and analysis that, the solution shown in FIG. 4 has at least some problems to solve: that the charging loop is periodically turned off during battery charging increases charging time and reduces system charging efficiency; in addition, after battery charging is cut off, battery power is used to perform battery presence detection, which consumes battery energy and reduces battery life.

Therefore, this embodiment of the present invention provides a technical solution. The solution is used for a rechargeable battery that has at least a "+" terminal and a "−" terminal, and implements automatic battery presence detection in a case in which no external component exists. Moreover, the charging efficiency is not affected in a detection process.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 5:
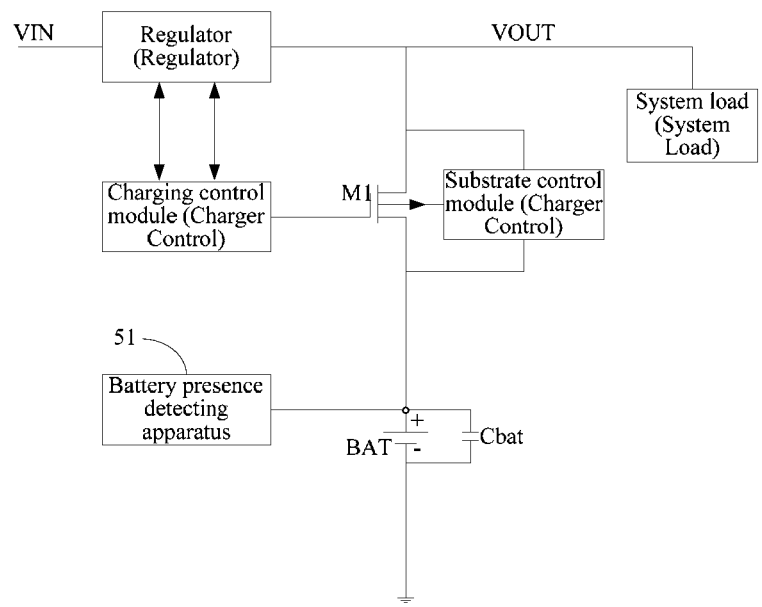
FIG. 5 exemplarily shows a block diagram of a charging system that is applicable to a battery presence detecting apparatus according to the present invention.

FIG. 5 shows a block diagram of a charging system that is applicable to a battery presence detecting apparatus of the present invention, where a battery presence detecting apparatus 51 is added to the system based on the foregoing FIG. 1.

Figure 6:
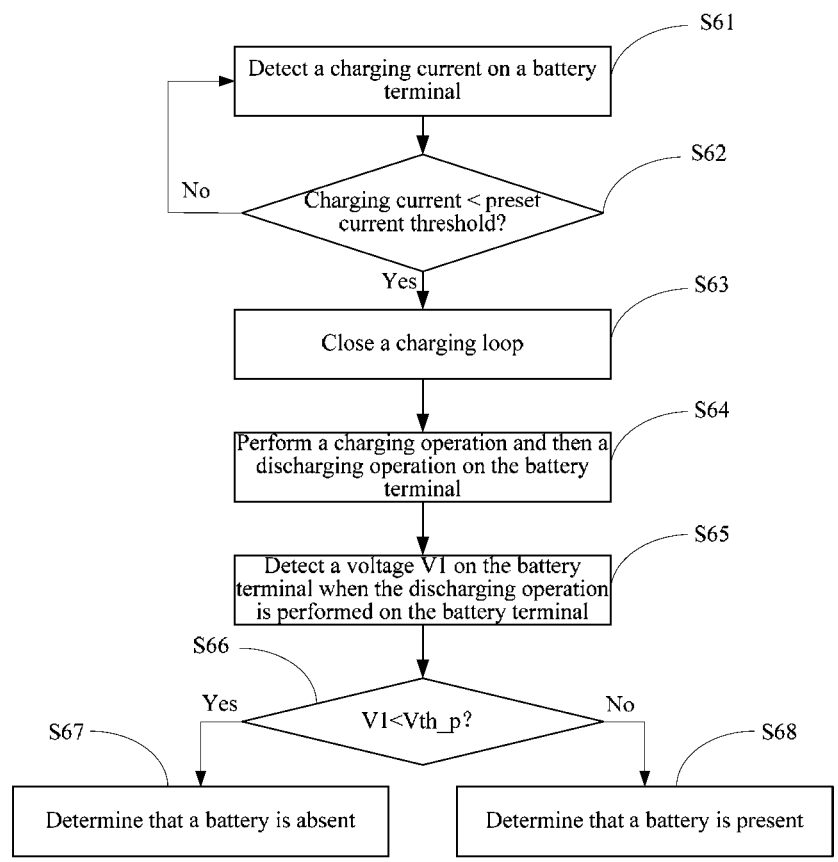
FIG. 6 exemplarily shows a flowchart of a battery presence detecting method.

The battery presence detecting apparatus 51 is connected to a "+" terminal of a battery terminal BAT. Performing a battery presence detecting method according to a process shown in FIG. 6 includes the following steps:

Step S61. Detect a charging current on a battery terminal.

Step S62. Determine whether the charging current is less than a preset current threshold; if the charging current is less than the preset current threshold, go to step S63; otherwise, return to step S61.

Step S63. Turn off a charging loop of the battery charging system.

Specifically, when the charging current on the battery terminal is less than the preset current threshold, the charging loop of the battery charging system is turned off (that is, a charging power tube M1 is turned off).

Step S64. Perform a charging operation and then a discharging operation on the battery terminal.

In this embodiment, periods of time for the battery terminal to perform the charging operation and the discharging operation may be the same and may also be different. When the periods of time are the same, a charging operation within a preset period of time may be performed first, and then the discharging operation within the same preset period of time is performed. In this embodiment, values of the charging current and a discharging current on the battery terminal are equal.

Step S65. Detect a voltage V1 on the battery terminal in a process of performing the discharging operation on the battery terminal.

Step S66. Compare values of the voltage V1 on the battery terminal and a preset detection voltage Vth_p; if a value of the voltage V1 on the battery terminal is less than that of the preset detection voltage Vth_p, go to step S67; otherwise, go to step S68.

In this embodiment of the present invention, the preset detection voltage Vth_p is less than a normal working voltage when the battery is present.

Step S67. Determine that the battery is absent.

In this embodiment, that the battery is absent may be indicated by outputting a battery absence signal, and that the battery is absent may also be indicated by outputting other set signals. Certainly, a person of ordinary skill in the art may easily understand that other manners may be used to indicate that the battery is absent, and details are not described herein again in this embodiment.

Step S68. Determine that the battery is present.

In this embodiment, a manner of determining that the battery is present may be indicating by outputting a battery presence signal, and that the battery is present may also be indicated by outputting a certain set signal. Certainly, that the battery is present may also be indicated by not outputting any signal. Details are not described herein again in this embodiment.

In a practical application process, it is assumed that the battery is removed in a normal charging process. In this case, the "+" terminal and the "−" terminal of the battery are disconnected, but a charging control module still controls the charging current to charge the battery; due to existence of a battery bypass capacitor Cbat, the voltage on the battery terminal increases rapidly while the charging current decreases; and when the current decreases to a value that is less than the preset current threshold, the charging power tube M1 is turned off, and the charging operation and the discharging operation are performed. Specifically, after the charging power tube M1 is turned off, the charging operation is performed first. In this case, for the battery terminal, a certain voltage is kept on the battery terminal or increases gradually due to the existence of the battery bypass capacitor Cbat. In a process of performing the discharging operation, the voltage on the battery terminal decreases gradually due to existence of a discharging current, and if the battery is absent (that is, the battery is removed), in a preset discharging period of time, a voltage on the battery terminal is less than a working voltage (which may be referred to as a preset detection voltage) when the battery is present. Therefore, whether the battery is present may be determined according to a result of a comparison between a voltage on the battery terminal after the discharging operation and the preset detection voltage, that is, if it is found that the voltage on the battery terminal is less than the preset detection voltage at any time in the preset period of time, a "battery absence" signal is immediately sent, so as to avoid ceaseless detection.

Certainly, in the practical application process, if the battery is always present, the foregoing charging process and the discharging process have no obvious impact on the voltage on the battery terminal, and the system does not send a battery absence signal.

In addition, in this embodiment, in view of that the charging current is 0 when the battery is present but battery charging is terminated or forbidden in the system, the system still triggers battery presence detection; if there is only a discharging cycle, the battery additionally consumes energy and battery energy decreases gradually. Therefore, to balance electric quantity of a battery, a charging cycle with same time and a same current is inserted before each discharging cycle in this embodiment. Therefore, no extra energy loss of a battery is caused, and the battery life is prolonged.

It may be seen that, the battery presence detecting apparatus 51 only needs to be connected to a battery terminal to perform battery presence detection, which is applicable to a rechargeable battery that only has a "+" terminal and a "−" terminal. That a charging loop is turned off periodically is not required in a charging process, and detection is triggered in a case in which a charging current decreases to a certain degree; therefore, charging efficiency is less impacted. In addition, charging and discharging operations are performed when the detection is performed, and then the detection is performed. In this case, no extra energy loss of a battery is caused, and battery life is prolonged.

Figure 7:
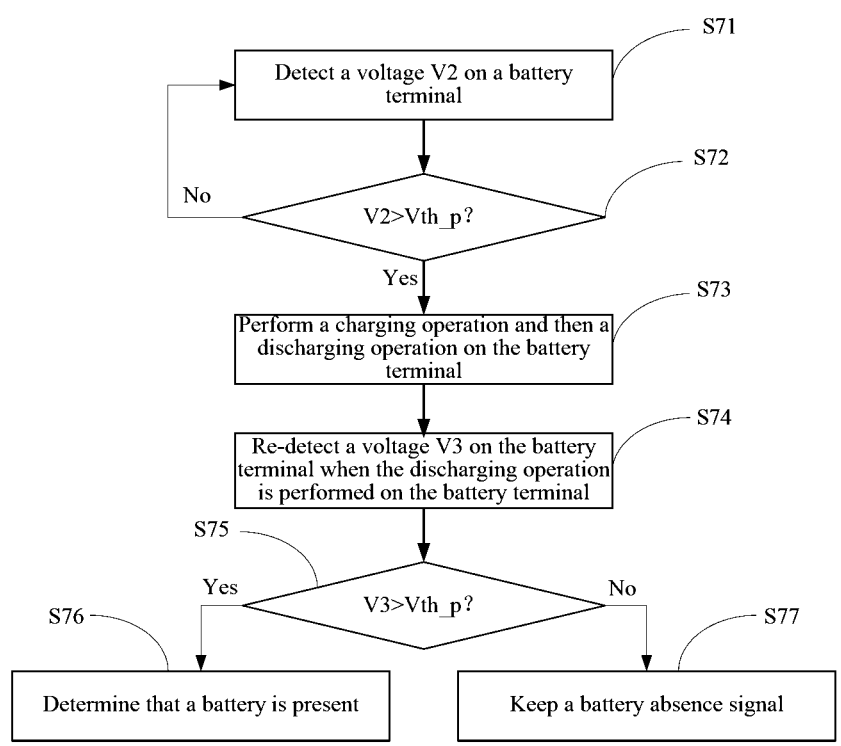
FIG. 7 exemplarily shows a flowchart of another battery presence detecting method.

In some embodiments, the battery presence detecting method described in this embodiment of the present invention may further include: a detection process that is used when a battery is re-inserted after it is detected that the battery is absent. The detection process is shown in FIG. 7.

Specifically, after step S67, the method may further include the following steps:

Step S71. Detect a voltage V2 on the battery terminal.

Step S72. Determine whether the voltage V2 on the battery terminal is greater than the preset detection voltage Vth_p. If the voltage V2 on the battery terminal is greater than the preset detection voltage Vth_p, perform step S73; otherwise, return to step S71.

Step S73. Perform a charging operation and then a discharging operation on the battery terminal.

The step is basically the same as the foregoing step S64. A charging operation within a preset period of time may be performed first, and then a discharging operation within the same preset period of time is performed. In this embodiment, values of the charging current and the discharging current are equal.

Step S74. Re-detect a voltage V3 on the battery terminal in a process of performing the discharging operation on the battery terminal.

Step S75. Compare values of the voltage V3 on the battery terminal with the preset detection voltage Vth_p. If the voltage V3 is greater than the preset detection voltage Vth_p, go to step S76; otherwise, go to step S77.

Step S76. Determine that the battery is present.

Specifically, after it is determined that the battery is present, that is, it is determined that the battery is in a re-inserted state. In this case, that the battery is present again may be determined in such a manner as clearing a battery absence signal. Details are not described herein again.

Step S77. Keep the battery absence signal.

Figure 8:
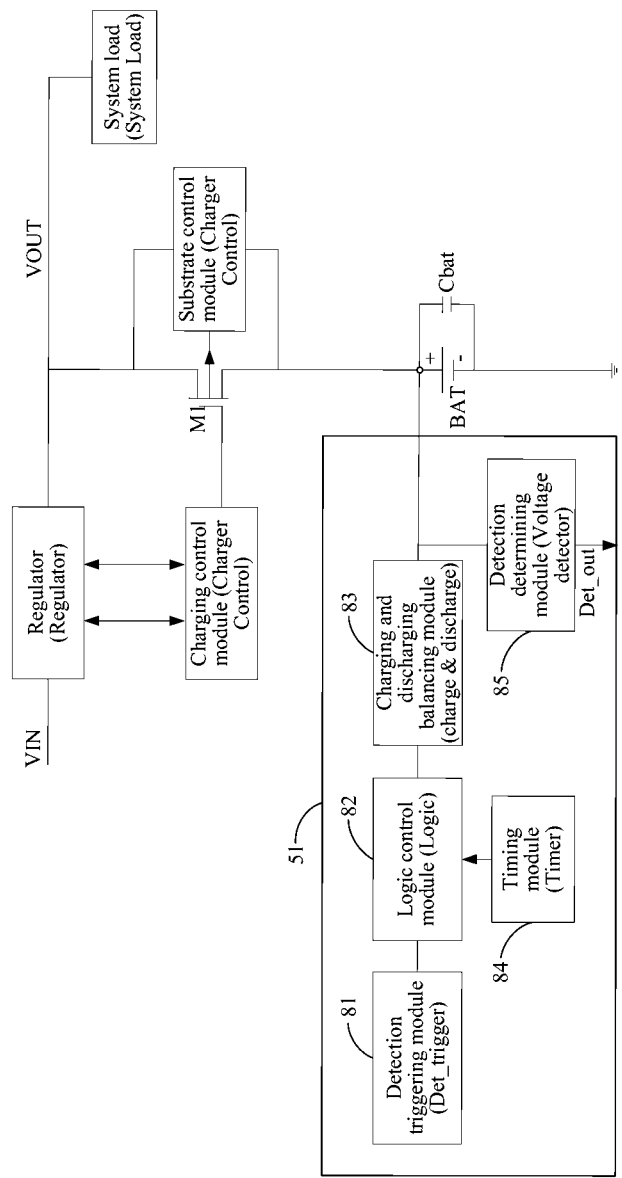
FIG. 8 exemplarily shows a structural diagram of a battery presence detecting apparatus.

The battery presence detecting apparatus 51 has various types of specific structure manners, and FIG. 8 shows a possible structure. As shown in FIG. 8, the battery presence detecting apparatus 51 includes a detection triggering module (Det_trigger) 81, a logic control module (Logic) 82, a charging and discharging balancing module (Charge & discharge) 83, and a detection determining module (Voltage detector) 85.

The detection triggering module 81 is connected to a battery terminal in a battery charging system, is configured to detect a charging current on the battery terminal, and send a triggering signal to the logic control module 82 when the charging current is less than a preset current threshold (Ith_open).

The logic control module 82 is configured to: after the triggering signal is received, send a charging closing instruction to the battery charging system, and send a first operation instruction to the charging and discharging balancing module 83.

Specifically, after receiving the triggering signal, the logic control module 82 instructs a charging control module in the battery charging system to turn off a charging loop (that is, to turn off a charging power tube M1, and instructs the charging and discharging balancing module to perform a charging operation and a discharging operation on the battery terminal successively, that is, the charging operation is performed on the battery terminal first, and the charging current is a set value (Ichg); and then the discharging operation is performed on the battery terminal, and values of a discharging current and the charging current are equal.

The battery presence detecting apparatus 51 in this embodiment of the present invention may further include a timing module (Timer) 84, where the timing module 84 may be configured to instruct the charging and discharging balancing module 83 to perform the charging operation and the discharging operation on the battery terminal within a preset period of time. For example, a period of time for performing the charging operation is a first fixed period of time (Tchg1) preset by the timing module 84; and similarly, a period of time for the discharging operation is a second fixed period of time (Tchg2) preset by the timing module 84.

Preferably, preset periods of time in which the charging and discharging balancing module 82 performs, as instructed by the timing module 84, the charging operation and the discharging operation on the battery terminal may be the same. For example, the charging operation period (that is, the first fixed time of period) in the foregoing example may be to the same with the discharging operation period (that is, the second fixed period of time).

The charging and discharging balancing module 83 is configured to perform the charging operation and then the discharging operation on the battery terminal according to the first operation instruction, and send a first detection instruction to the detection determining module 85 when the discharging operation is performed on the battery terminal.

The detection determining module 85 is configured to detect a voltage on the battery terminal when the first detection instruction is received, and determine whether the voltage on the battery terminal is less than a preset detection voltage, and if the voltage on the battery terminal is less than the preset detection voltage, determine that the battery of the battery charging system is absent, and otherwise, determine that the battery is present.

Specifically, the detection determining module 85 compares a detected voltage on the battery terminal with the preset detection voltage, and if the voltage on the battery terminal is less than the preset detection voltage, determines that the battery is absent and outputs a battery absence signal, and otherwise, determines that the battery is present, and outputs a battery presence signal, or outputs no signal to indicate that the battery is present.

Figure 9:
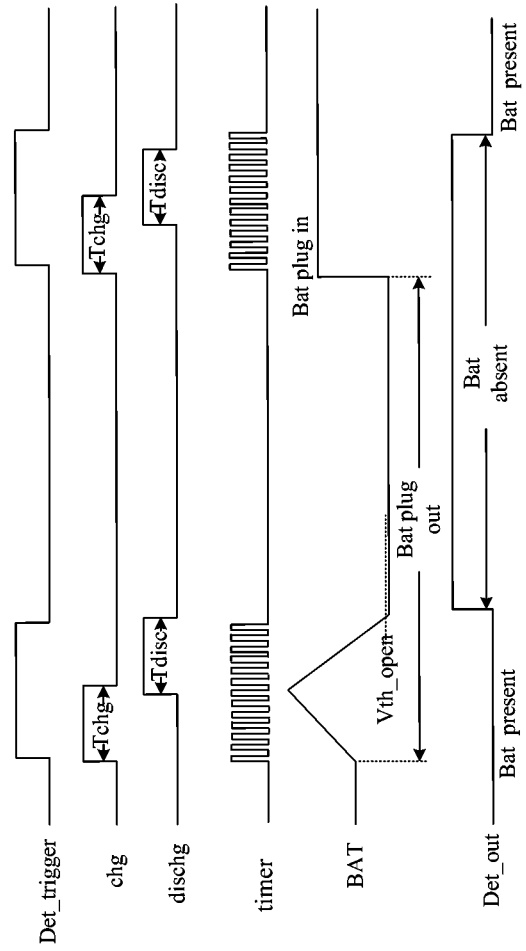
FIG. 9 exemplarily shows a schematic diagram of a signal of a foregoing battery presence detecting apparatus.

Referring to FIG. 9, FIG. 9 is a working sequence diagram of each component of the apparatus in FIG. 8.

A Det_trigger signal is a triggering signal sent by the detection triggering module 81, where the triggering signal represents a working state when the triggering signal presents a high level; and the triggering signal represents an idle state when the triggering signal presents a low level.

A chg signal is a charging signal on the battery terminal, where Tchg indicates a charging period of time.

A dischg signal is a discharging signal on the battery terminal, where Tdisc indicates a discharging period of time.

A BAT signal is a voltage signal on the battery terminal, where a waveform of the BAT signal indicates that: when the Det_trigger signal is at the high level, and the voltage on the battery terminal increases first and then falls back to be lower than the preset detection voltage (Vth_open), which indicates that the battery is in a removed state (Bat plug out); and Bat plug in indicates that the battery is in an inserted state.

A Det_out signal is an output signal of the detection determining module 85 and is used to indicate whether the battery is present. Specifically, when the Det-out signal is at a high level, it indicates that the battery is absent (Bat absent); and when the Det-out signal is at a low level, it indicates that the battery is present (Bat present).

In this embodiment of the present invention, another possible structure of the battery presence detecting apparatus is further provided. A difference between the battery presence detecting apparatus and the apparatus shown in FIG. 8 is that the battery presence detecting apparatus may further include a processing module, where:

the processing module is configured to send a second detection instruction to the detection determining module 85 when a result of the determining by the detection determining module is that the battery is absent.

The detection determining module 85 is further configured to: when the second detection instruction is received, detect the voltage on the battery terminal, determine whether the voltage on the battery terminal is greater than the preset detection voltage, and send a second operation instruction to the charging and discharging balancing module 83 if the voltage on the battery terminal is greater than the preset detection voltage.

The charging and discharging balancing module 83 is further configured to perform the charging operation and then the discharging operation on the battery terminal according to the second operation instruction; and send a third detection instruction to the detection determining module 85 when the discharging operation is performed on the battery terminal.

The detection determining module 85 is further configured to: when the third detection instruction is received, detect the voltage on the battery terminal, and determine whether the voltage on the battery terminal is still greater than the preset detection voltage, and if the voltage on the battery terminal is still greater than the preset detection voltage, determine that the battery of the battery charging system is present again, and otherwise, determine that the battery is still absent.

In a practical application, each component of the battery presence detecting apparatus 51 described in this embodiment of the present invention may have various specific implementation manners, and description is provided with reference to one of the implementation manners in the following.

Figure 10:
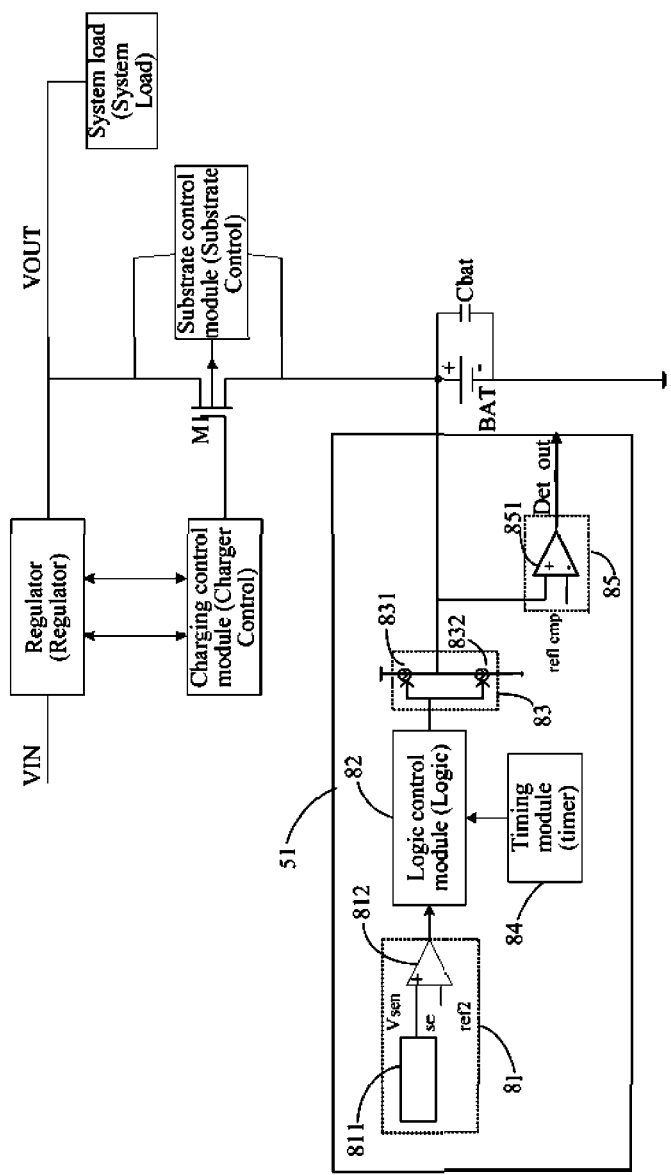
FIG. 10 exemplarily shows a structural diagram of another battery presence detecting apparatus.

Referring to FIG. 10, FIG. 10 is a structural diagram of a specific implementation manner of the battery presence detecting apparatus 51 according to an embodiment of the present invention. It should be noted herein that the battery presence detecting apparatus 51 in this embodiment of the present invention may be implemented by using, but is not limited to, using a circuit structure shown in FIG. 10. Actually, any circuit that can implement the foregoing function may be applied to the battery presence detecting apparatus 51 in this embodiment of the present invention.

As shown in FIG. 10, the detection triggering module 81 may include a charging current sensor 811 and a comparator 812.

An output end of the charging current sensor 811 is connected to a positive input end of the comparator 812; a negative input end of the comparator 812 receives a preset reference voltage value; and an output end of the comparator 812 is connected to a receiving end of a triggering signal of the logic control module 82;

The charging current sensor 811 is configured to detect a charging current on the battery terminal, and output a voltage value corresponding to a detected charging current to the positive input end of the comparator 812.

The comparator 812 is configured to compare values of the voltage value output by the charging current sensor 811 with the preset reference voltage value, and send a triggering signal to the logic control module 82 when the voltage value output by the charging current sensor 811 is less than the preset reference voltage value.

Specifically, the preset reference voltage value corresponds to a preset current threshold. When the voltage value output by the charging current sensor 811 is less than the preset reference voltage value, it indicates that the charging current on the battery terminal in this case is less than the preset current threshold.

When a charging current collected by the charging current sensor 811 decreases, a voltage at the positive input end of the comparator 812 also decreases; and when the voltage decreases to a preset reference voltage value received at the negative input end of the comparator 812, the comparator 812 outputs the triggering signal to the logic control module 82.

As shown in FIG. 10, the charging and discharging balancing module 83 may include two same current sources: a first current source 831 and a second current source 832, where the two current sources separately perform a charging operation and a discharging operation on the battery, so as to ensure a balance between the charging current and the discharging current. Certainly, in the practical application, the charging and discharging balancing module 83 may further include two other means in which a current can be provided, for example, a means of a diode (diode) or a resistor.

The detection determining module 85 may specifically be a comparator. As shown in FIG. 10, the detection determining module 85 includes a second comparator 851.

A positive input end of the second comparator 851 is connected to the battery terminal of the charging system, and a negative input end of the second comparator 851 is connected to the preset detection voltage, and an output end of the second comparator 851 serves as an output end of the battery presence detecting apparatus, and a signal that indicates whether the battery is present is output at the output end.

Specifically, the second comparator 851 compares the detected voltage on the battery terminal with the preset detection voltage, and if the voltage on the battery terminal is less than the preset detection voltage, determines that the battery is absent, and outputs a signal that indicates that the battery is absent, and otherwise, determines that the battery is present, and outputs a battery presence signal, or outputs no signal to indicate that the battery is present.

As shown in FIG. 10, the second comparator 851 may output a Det_out signal. When the voltage on the battery terminal is less than the preset detection voltage, the Det_out signal is at a high level, which indicates that the battery is absent.

In other embodiments, the detection triggering module 81 and the detection determining module 85 may also be a Schmitt trigger or other devices with a built-in threshold determining function.

It should be noted that the embodiments of the present specification are described in a progressive manner. Description of each embodiment focuses on its difference from other embodiments. For same or similar parts of the embodiments, mutual reference to each other may be made.

Figure 11:
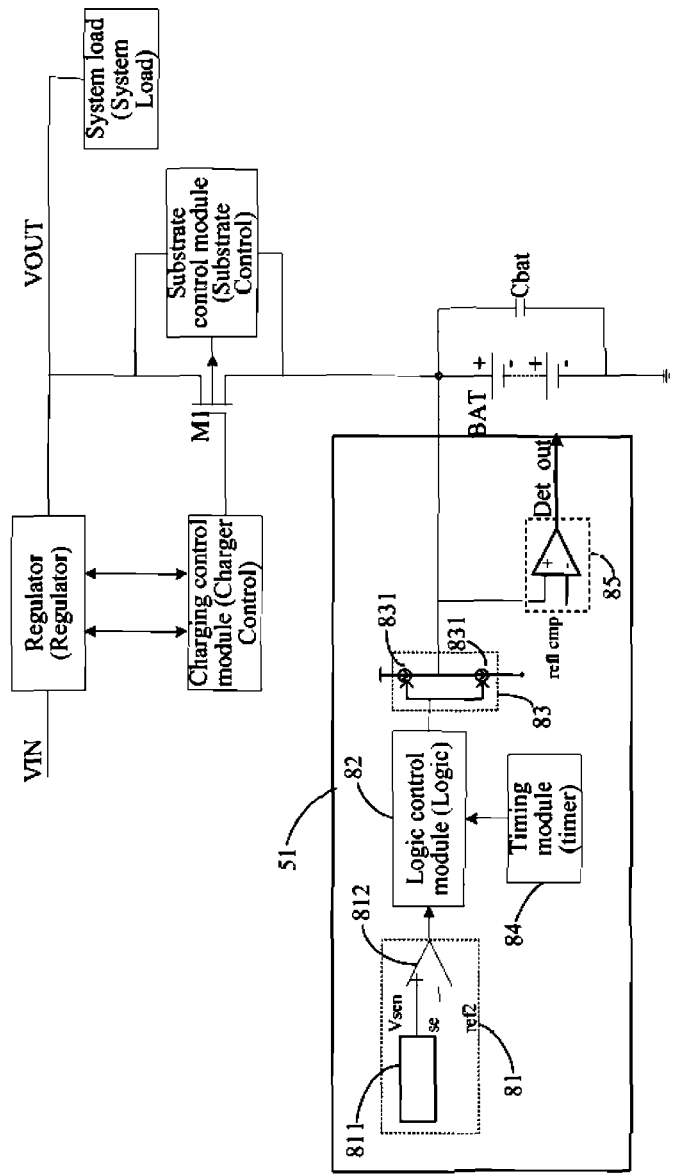
FIG. 11 exemplarily shows a structural block diagram of a charging system that uses a battery presence detecting apparatus.

In addition, it should further be noted that the charging system that includes the battery presence detecting apparatus 51 also falls within the protection scope of the present invention. In addition, as shown in FIG. 11, the charging system may include one rechargeable battery or multiple rechargeable batteries in serial connection.

The foregoing descriptions of the disclosed embodiments help a person skilled in the art implement or use the present invention. Various modifications to these embodiments are apparent to a person skilled in the art. The general principle defined in this specification applies to other embodiments without departing from the spirit or scope of the present invention. Therefore, the scope of the present invention extends to any embodiments that comply with the principle and new features disclosed in this specification, and is not limited to the embodiments disclosed in this specification.

What is claimed is:

1. A battery presence detecting apparatus, connected to a battery charging system, the apparatus comprising a detection triggering module, a logic control module, a charging and discharging balancing module, and a detection determining module, wherein:

the detection triggering module is connected to a battery terminal in the battery charging system, is configured to detect a charging current on the battery terminal, and send a triggering signal to the logic control module when the charging current is less than a preset current threshold;

the logic control module is configured to send a charging closing instruction to the battery charging system and send a first operation instruction to the charging and discharging balancing module after the triggering signal is received;

the charging and discharging balancing module is configured to, after a charging loop of the battery charging system is turned off, perform a charging operation and then a discharging operation on the battery terminal according to the first operation instruction, and send a first detection instruction to the detection determining module when the discharging operation is performed on the battery terminal, wherein the charging and discharging balancing module comprises a first current source and a second current source, wherein a current of the first current source is the same as a current of the second current source, and wherein the first current source and the second current source separately perform the charging operation and the discharging operation; and the detection determining module is configured to detect a voltage on the battery terminal in response to receiving the first detection instruction, and determine whether the voltage on the battery terminal is less than a preset detection voltage, and if the voltage on the battery terminal is less than the preset detection voltage, determine that a battery of the battery charging system is absent, and otherwise, determine that the battery is present, wherein the preset detection voltage is less than a working voltage when the battery is present.

2. The battery presence detecting apparatus according to claim 1, wherein the apparatus further comprises:

a processing module, configured to send a second detection instruction to the detection determining module when a result of the determining by the detection determining module is that the battery is absent, wherein:

the detection determining module is further configured to detect the voltage on the battery terminal when the second detection instruction is received, determine whether the voltage on the battery terminal is greater than the preset detection voltage, and send a second operation instruction to the charging and discharging balancing module if the voltage on the battery terminal is greater than the preset detection voltage;

the charging and discharging balancing module is further configured to perform the charging operation and then the discharging operation on the battery terminal according to the second operation instruction, and send a third detection instruction to the detection determining module when the discharging operation is performed on the battery terminal; and the detection determining module is further configured to detect the voltage on the battery terminal in response to receiving the third detection instruction, and determine whether the voltage on the battery terminal is greater than the preset detection voltage, and if the voltage on the battery terminal is greater than the preset detection voltage, determine that the battery of the battery charging system is present, and otherwise, determine that the battery is absent.

3. The battery presence detecting apparatus according to claim 1, wherein the apparatus further comprises:
   a timing module, configured to instruct the charging and discharging balancing module to perform the charging operation and the discharging operation on the battery terminal within a preset period of time.

4. The battery presence detecting apparatus according to claim 3, wherein:
   preset periods of time in which the charging and discharging balancing module performs, as instructed by the timing module, the charging operation and the discharging operation on the battery terminal are the same.

5. The battery presence detecting apparatus according to claim 1, wherein the detection triggering module comprises a charging current sensor and a comparator; wherein:
   an output end of the charging current sensor is connected to a positive input end of the comparator, a negative input end of the comparator receives a preset reference voltage value, and an output end of the comparator is connected to the logic control module;
   the charging current sensor is configured to detect the charging current on the battery terminal, and output a voltage value corresponding to the detected charging current to the positive input end of the comparator; and
   the comparator is configured to compare the voltage value output by the charging current sensor with the preset reference voltage value, and send the triggering signal to the logic control module when the voltage value output by the charging current sensor is less than the preset reference voltage value, wherein:
   the preset reference voltage value corresponds to the preset current threshold.

6. The battery presence detecting apparatus according to claim 1, wherein the detection determining module comprises a comparator, wherein:
   a positive input end of the comparator is connected to the battery terminal of the charging system, and a negative input end of the comparator receives the preset detection voltage, and an output end of the comparator serves as an output end of the battery presence detecting apparatus and outputs a signal that indicates whether the battery is present; and
   the comparator is configured to compare the detected voltage on the battery terminal with the preset detection voltage, and if the voltage on the battery terminal is less than the preset detection voltage, determine that the battery is absent, and output a signal that indicates that the battery is absent, and otherwise, determine that the battery is present, and output a battery presence signal, or output no signal to indicate that the battery is present.

7. A battery charging system, wherein the system comprises the battery presence detecting apparatus according to claim 1.

8. A battery presence detecting method, wherein the method comprises:
   detecting a charging current on a battery terminal;
   turning off a charging loop of a battery charging system when the charging current is less than a preset current threshold; and thereafter
   performing a charging operation and then a discharging operation on the battery terminal using a first current source and a second current source, wherein a current of the first current source is the same as a current of the second current source, and wherein the first current source and the second current source separately perform the charging operation and the discharging operation, and detecting a voltage on the battery terminal during the discharging operation; and
   if the voltage on the battery terminal is less than a preset detection voltage, determining that a battery is absent; otherwise, determining that the battery is present, wherein the preset detection voltage is less than a working voltage when the battery is present.

9. The method according to claim 8, wherein after the determining that a battery is absent, the method further comprises:
   detecting the voltage on the battery terminal;
   when the voltage on the battery terminal is greater than the preset detection voltage, performing the charging operation and then the discharging operation on the battery terminal, and re-detecting the voltage on the battery terminal during the discharging operation; and
   if the re-detected voltage on the battery terminal is greater than the preset detection voltage, determining that the battery is present; otherwise, determining that the battery is absent.

10. The method according to claim 8, wherein the determining that the battery is present comprises: outputting a battery presence signal or a first preset signal; and
   the determining that a battery is absent comprises: outputting a battery absence signal or a second preset signal.

* * * * *